United States Patent
Pierce et al.

(10) Patent No.: US 7,721,514 B1
(45) Date of Patent: May 25, 2010

(54) EQUINE WEIGHT TRAINING SYSTEM

(76) Inventors: Gina K. Pierce, 43618 161st Ave., Clearbrook, MN (US) 56634; Robert G. Pierce, 43618 161st Ave., Clearbrook, MN (US) 56634

( * ) Notice: Subject to any disclaimer, the term of this patent is extended or adjusted under 35 U.S.C. 154(b) by 163 days.

(21) Appl. No.: 12/027,301

(22) Filed: Feb. 7, 2008

(51) Int. Cl.
*B68C 1/20* (2006.01)
(52) U.S. Cl. .............................. 54/71; 54/37.1; 54/44.1; 224/905
(58) Field of Classification Search .................. 54/37.1, 54/44.1, 44.7, 71; 224/905
See application file for complete search history.

(56) References Cited

U.S. PATENT DOCUMENTS

| | | | |
|---|---|---|---|
| 77,234 A | | 4/1868 | York |
| 262,577 A | * | 8/1882 | Day .................................. 2/94 |
| 530,864 A | | 12/1894 | Torrey |
| 796,888 A | * | 8/1905 | Baker .......................... 54/37.1 |
| 1,059,240 A | * | 4/1913 | Walker ........................ 54/37.1 |
| 1,982,839 A | * | 12/1934 | Swanson ..................... 54/37.1 |
| 2,468,811 A | | 5/1949 | Carroll |
| 5,127,213 A | | 7/1992 | Petronio |
| 5,901,532 A | * | 5/1999 | Bopp ............................ 54/66 |
| 6,352,053 B1 | | 3/2002 | Records et al. |
| 6,634,160 B1 | | 10/2003 | Brauckmann-Towns |

OTHER PUBLICATIONS

Eponaire, LLC, Astride, <retrieved from http://www.eponaire.com/ Feb. 7, 2008>.

* cited by examiner

*Primary Examiner*—Rob Swiatek

(57) ABSTRACT

An equine weight training system for efficiently weight training a horse so that the horse may comfortably carry a bouncing load (e.g. individual, etc.) upon their back. The equine weight training system generally includes a saddle tree to be positioned upon a back of a horse and a harness device including a plurality of straps to loop over and attach to the saddle tree and around the horse, wherein the plurality of straps extend outwardly from the harness device. A plurality of pouches extend from the harness device, wherein a plurality of weighted objects are removably positioned within the plurality of pouches. The plurality of weighted objects are inserted and removed from the plurality of pouches to accustom a horse to weight positioned upon a back of a horse.

10 Claims, 8 Drawing Sheets

EQUINE WEIGHT TRAINING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to devices for training horses and more specifically it relates to an equine weight training system for efficiently weight training a horse so that the horse may comfortably carry a bouncing load (e.g. individual, etc.) upon their back.

2. Description of the Related Art

Any discussion of the related art throughout the specification should in no way be considered as an admission that such related art is widely known or forms part of common general knowledge in the field.

Horses have been used for many years for various purposes, such as but not limited to riding, hauling cargo, pulling objects and various other uses. Typically before placing any excessive amount of weight upon the horses back, the horse must be trained into carrying the respective weight to prevent injuring the horse.

Various methods have been utilized in the past to weight train the horse so that the horse is accustomed to carrying large amounts of weight upon the horse's back. However, many of these methods are not efficient in that they either do not provide enough weight increments; they do not easily and comfortably attach to the horse, or do not efficiently simulate a rider. Because of the inherent problems with the related art, there is a need for a new and improved equine weight training system for efficiently weight training a horse so that the horse may comfortably carry a bouncing load (e.g. individual, etc.) upon their back.

BRIEF SUMMARY OF THE INVENTION

The general purpose of the present invention is to provide an equine weight training system that has many of the advantages of the training device for horses mentioned heretofore. The invention generally relates to a horse training device which includes a saddle tree to be positioned upon a back of a horse and a harness device including a plurality of straps that loop over the saddle tree and around the horse, wherein the plurality of straps extend outwardly from the harness device. A plurality of pouches extend from the harness device, wherein a plurality of weighted objects are removably positioned within the plurality of pouches. The plurality of weighted objects are inserted and removed from the plurality of pouches to accustom a horse to weight positioned upon a back of a horse.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an equine weight training system for efficiently weight training a horse so that the horse may comfortably carry a bouncing load (e.g. individual, etc.) upon their back.

Another object is to provide an equine weight training system that easily attaches to a horse.

An additional object is to provide an equine weight training system that allows for a plurality of different weight increments which may be easily adjusted.

A further object is to provide an equine weight training system that simulates a bouncing rider upon the horse.

Another object is to provide an equine weight training system that may adjust to accommodate various size and shape horses.

Another object is to provide an equine weight training system that may be utilized to "ground drive" a horse.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
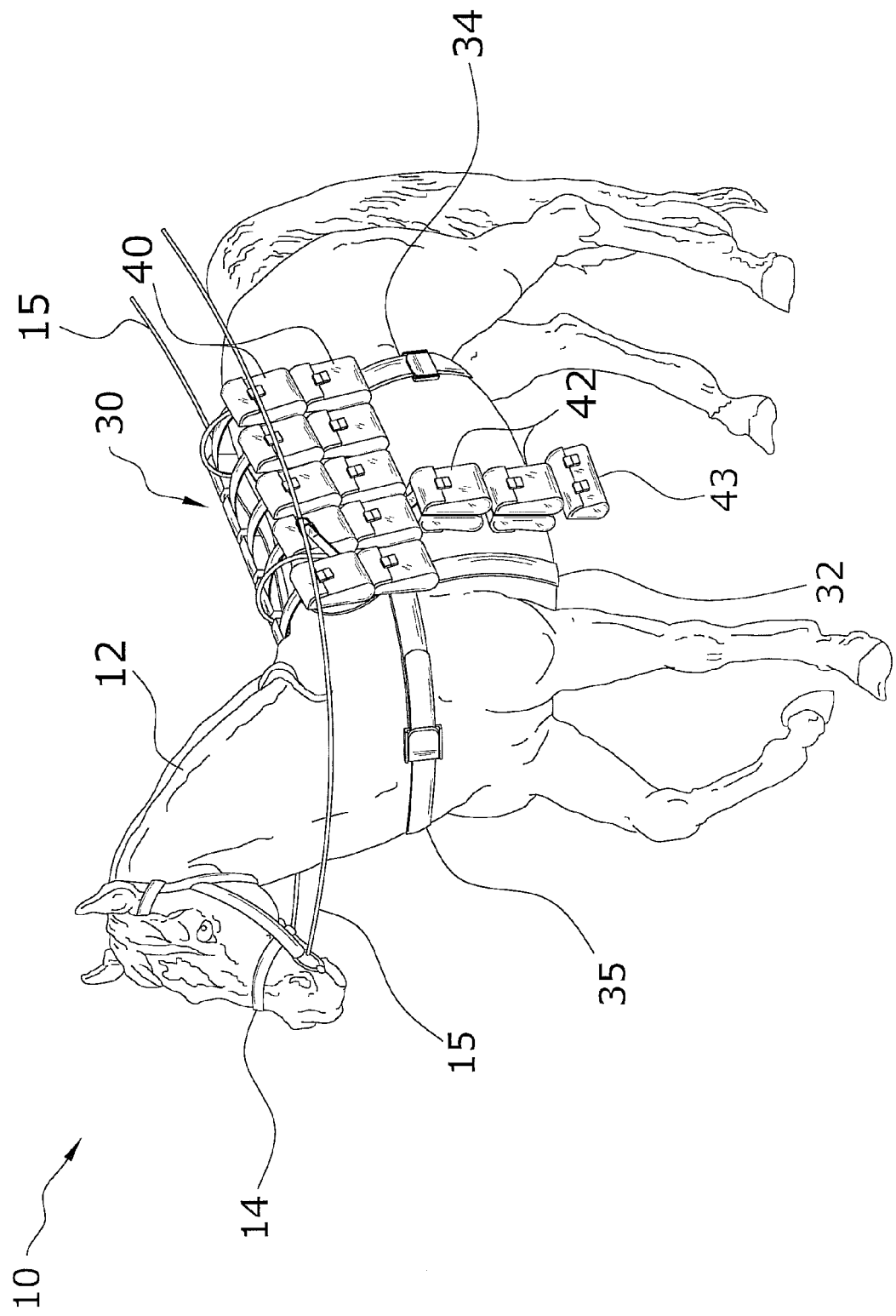
FIG. 1 is an upper perspective view of the present invention in use.
Figure 2:
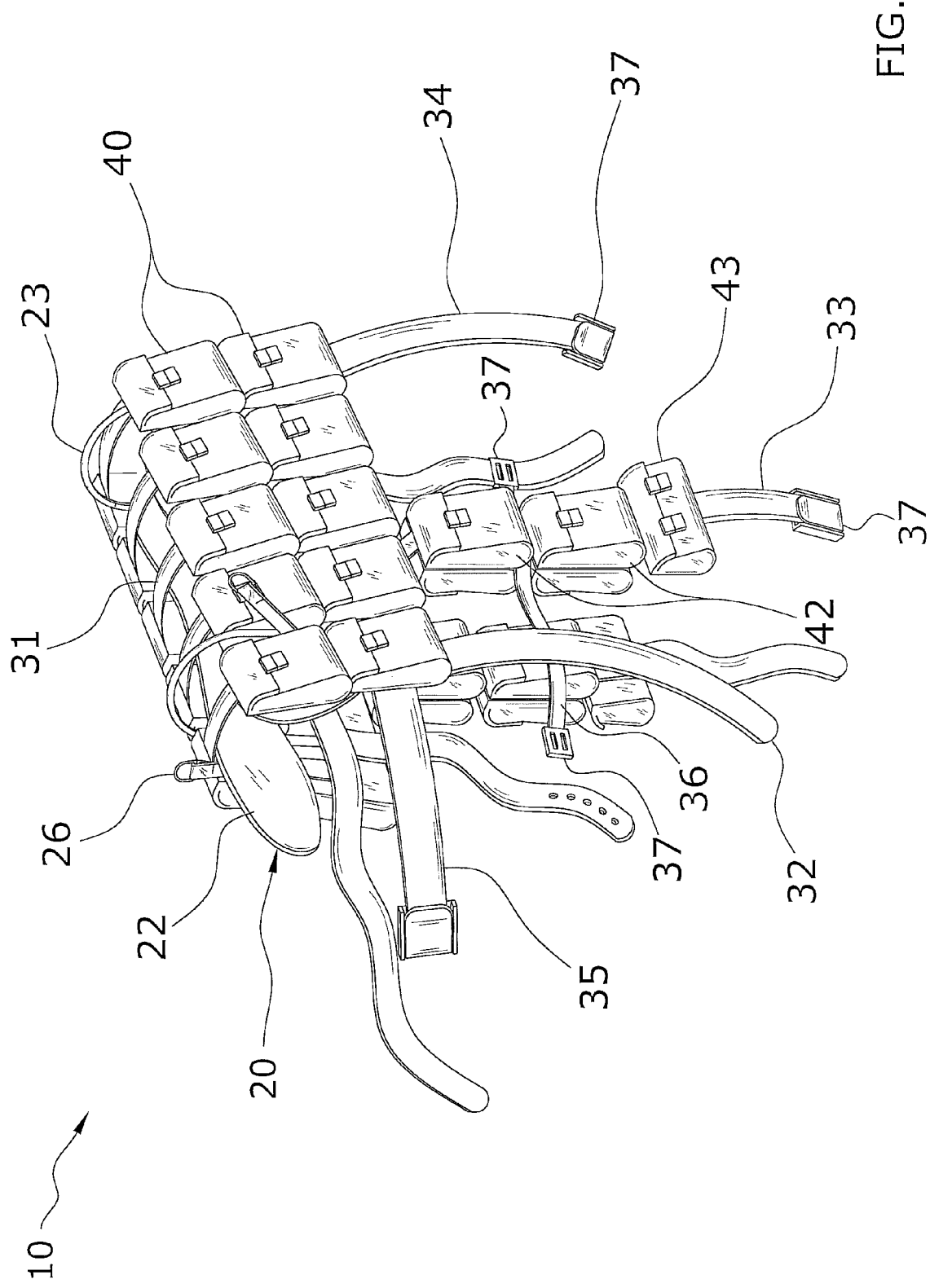
FIG. 2 is an upper perspective view of the present invention.
Figure 3:
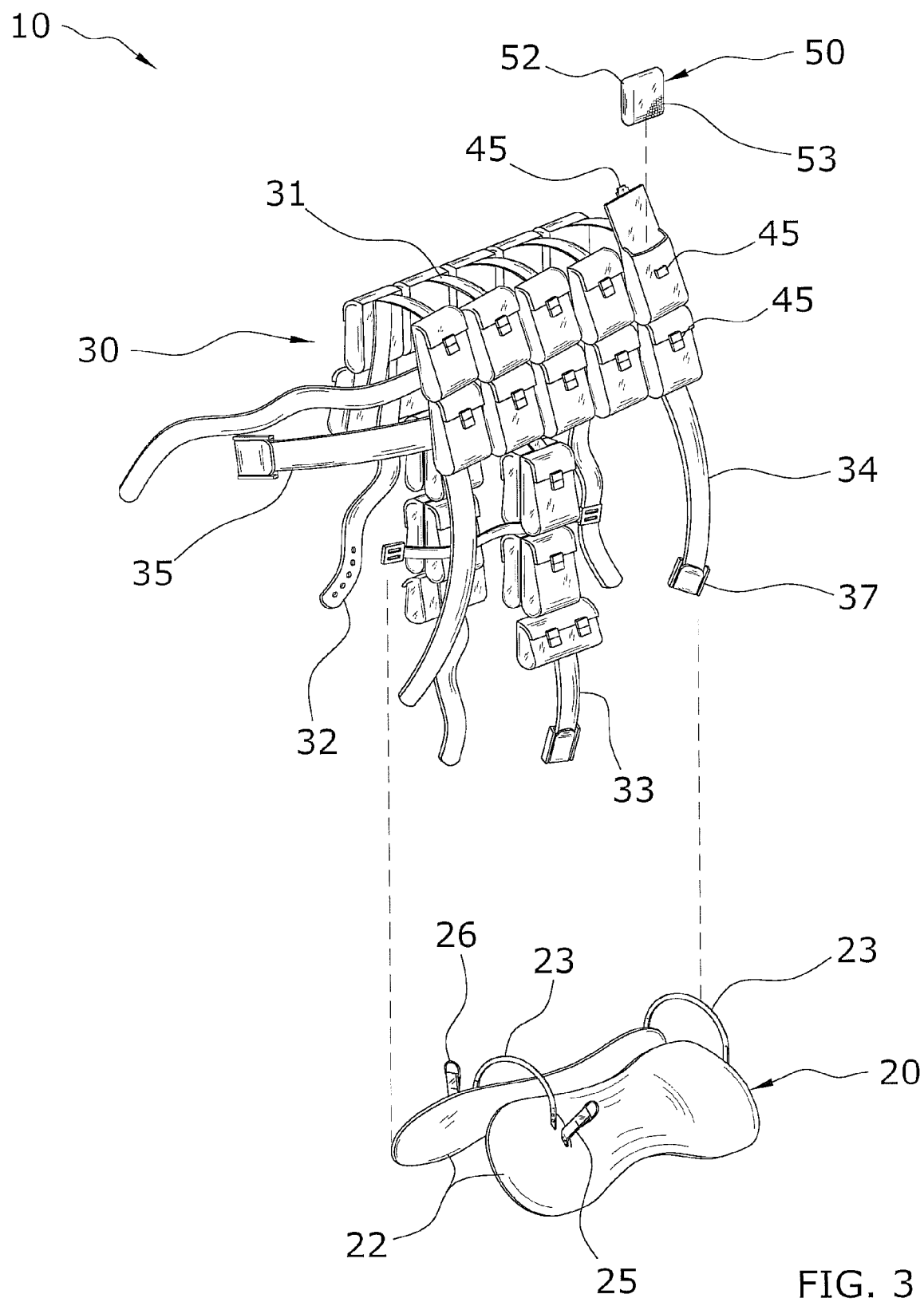
FIG. 3 is an exploded upper perspective view of the present invention.
Figure 4:
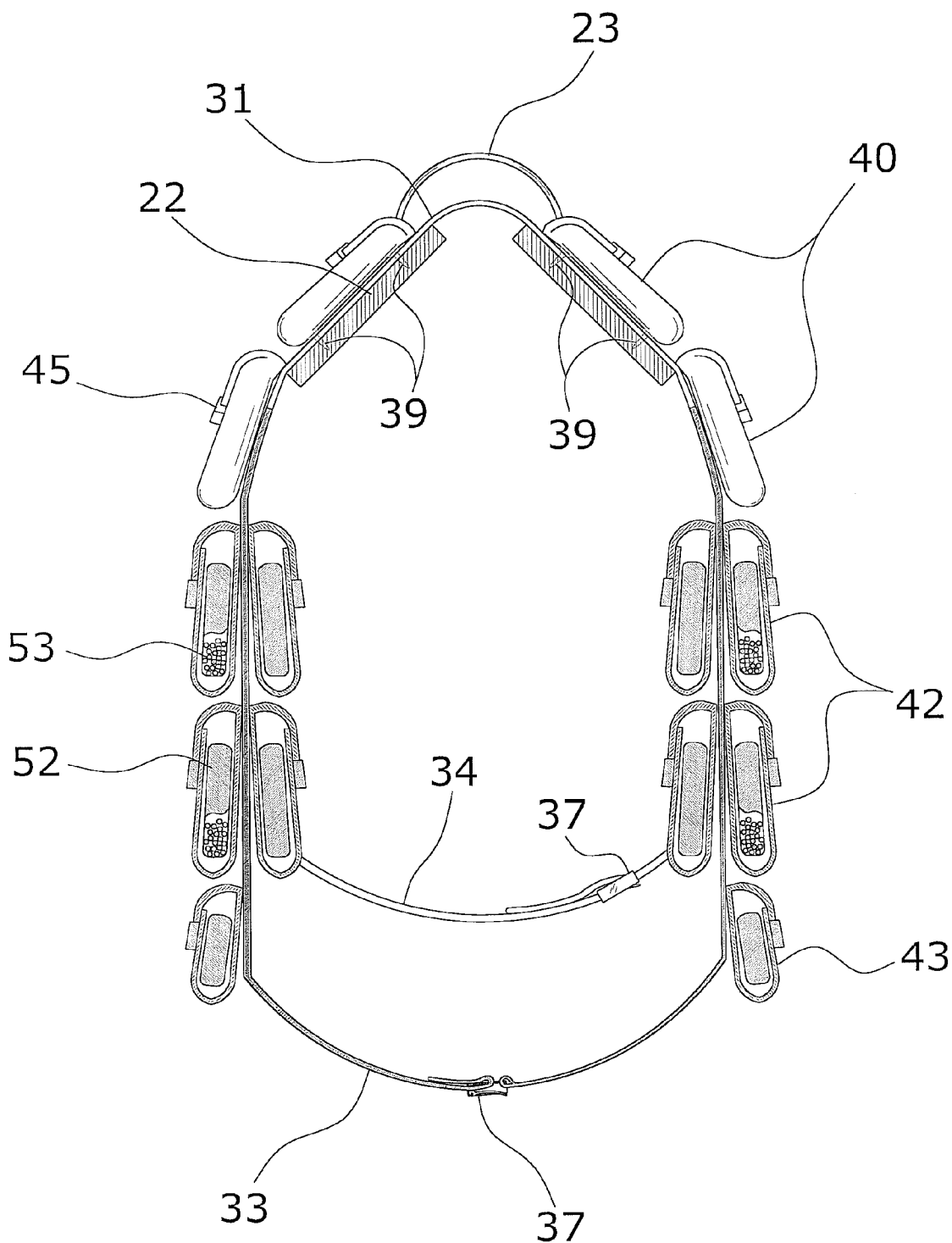
FIG. 4 is a lateral cross-sectional view of the present invention.
Figure 5:
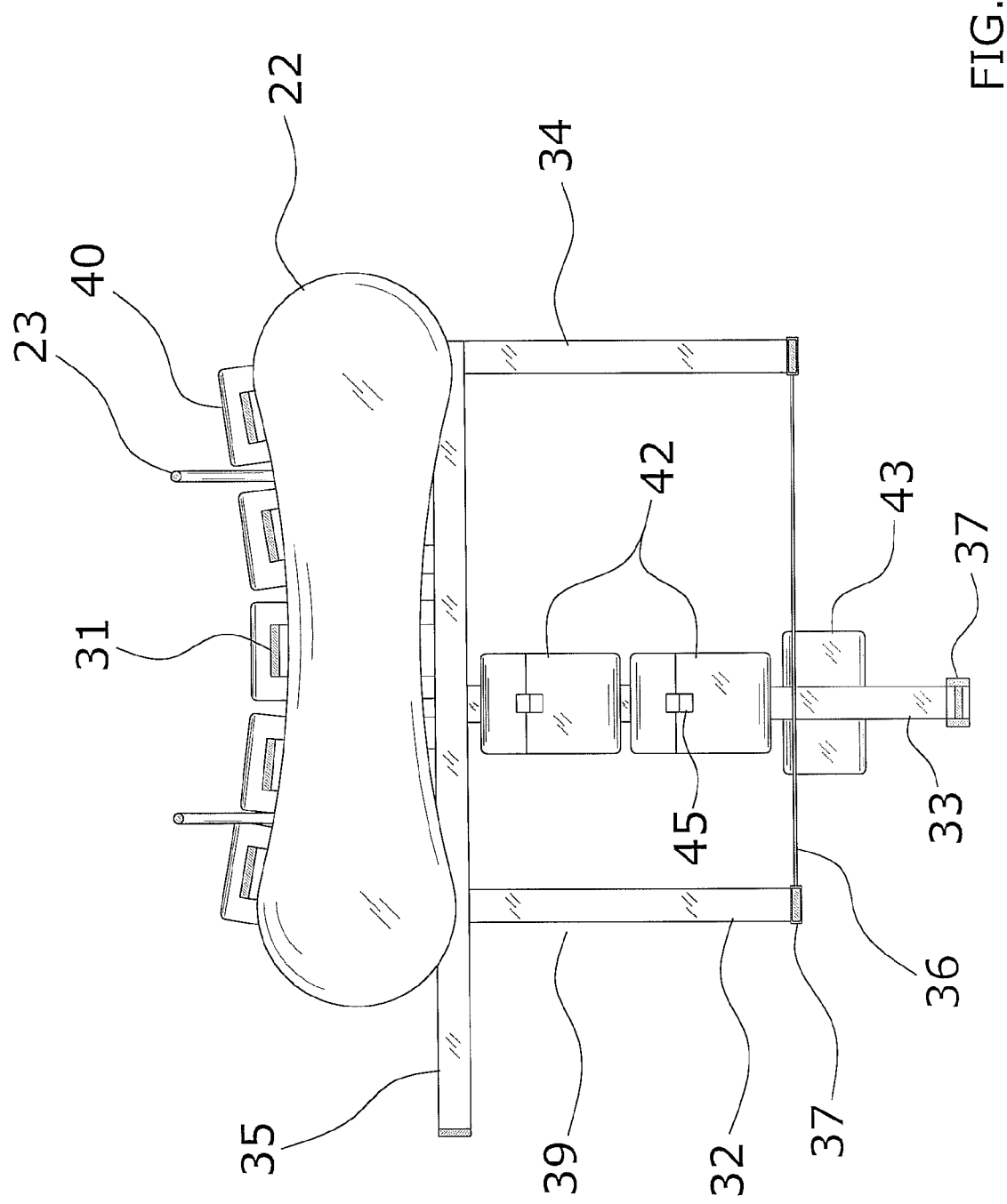
FIG. 5 is a longitudinal cross-sectional view of the present invention.
Figure 6:
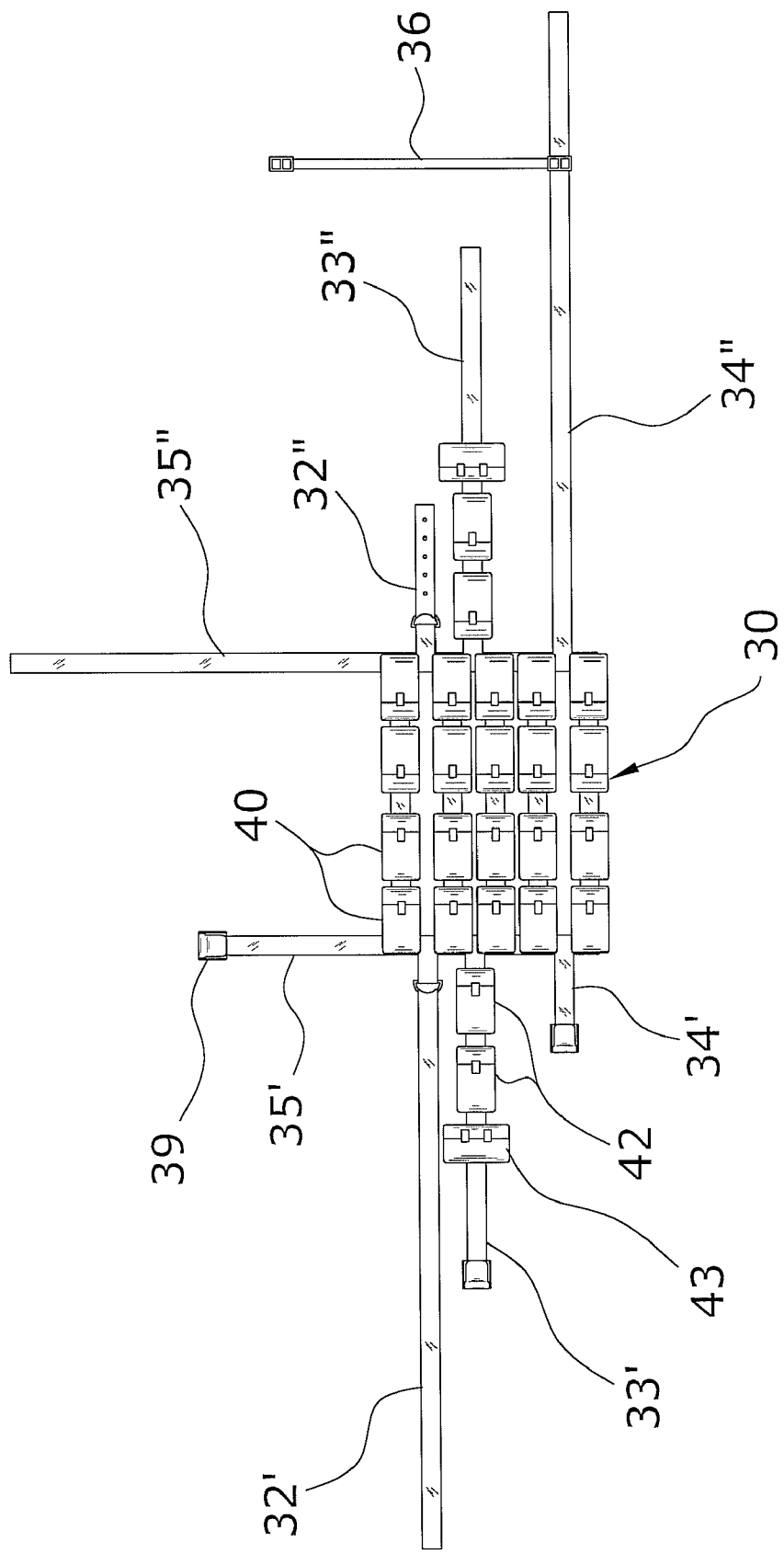
FIG. 6 is a top view of the harness device.
Figure 7:
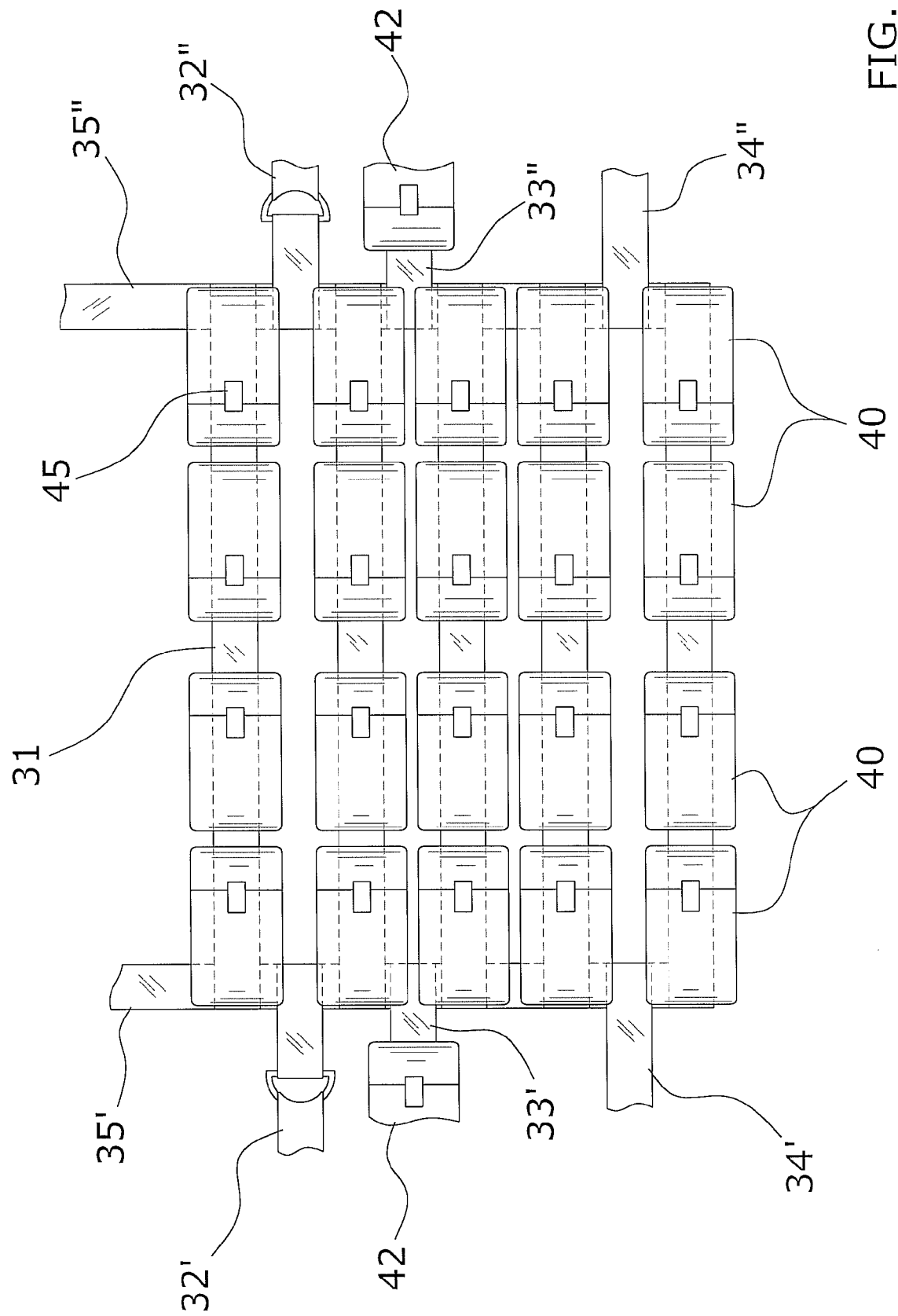
FIG. 7 is a magnified top view of the harness device portion illustrating the webbing section.

Turning now descriptively to the drawings, in which similar reference characters denote similar elements throughout the several views, FIGS. 1 through 8 illustrate an equine weight training system 10, which comprises a saddle tree 20 to be positioned upon a back of a horse 12 and a harness device 30 including a plurality of straps 32, 33, 34, 35 to loop over the saddle tree 20 and around the horse 12, wherein the plurality of straps 32, 33, 34, 35 extend outwardly from the harness device 30. A plurality of pouches 40, 42, 43 extend from the harness device 30, wherein a plurality of weighted objects 50 are removably positioned within the plurality of pouches 40, 42, 43. The plurality of weighted objects 50 are inserted and removed from the plurality of pouches 40, 42, 43 to accustom a horse 12 to weight positioned upon a back of a horse 12.

B. Saddle Tree

The saddle tree 20 is positioned around the back of the horse 12 and is utilized to keep the harness device 30 and weighted objects 50 from directly resting upon the back of the horse 12. The saddle tree 20 is comprised of a durable structure to withstand large amounts of weight from the weighted objects 50. The saddle tree 20 is also adjustable to fit over various size backs of various types of horses. The length of the saddle tree 20 is preferably substantially similar to that of the width of the harness device 30.

The saddle tree 20 includes a pair of support members 22, 22' for resting upon the upper sides of the back of the horse 12. The support members 22 are preferably comprised of a substantially planar configuration. It is appreciated that the support members 22 may include a slight curve to conform to the back of the horse 12. The support members 22 further preferably mirror each other about the longitudinal axis of the saddle tree 20. The support members 22 are preferably comprised of a plastic material; however it is appreciated that the support members 22 may be comprised of various materials rather than the preferred embodiment. Utilizing plastic material also allows the saddle tree 20 to be easily cleaned.

A pair of connecting rings 23 preferably connect each of the support members 22, wherein the connecting rings 23 extend across the front and the rear ends of the support members 22. The connecting rings 23 are preferably comprised of a C-shaped ring configuration to extend over the spine of the back of the horse 12 and to not engage the back of the horse 12. The connecting rings 23 may also assist in carrying the harness device 30 upon the saddle tree 20.

Figure 8:
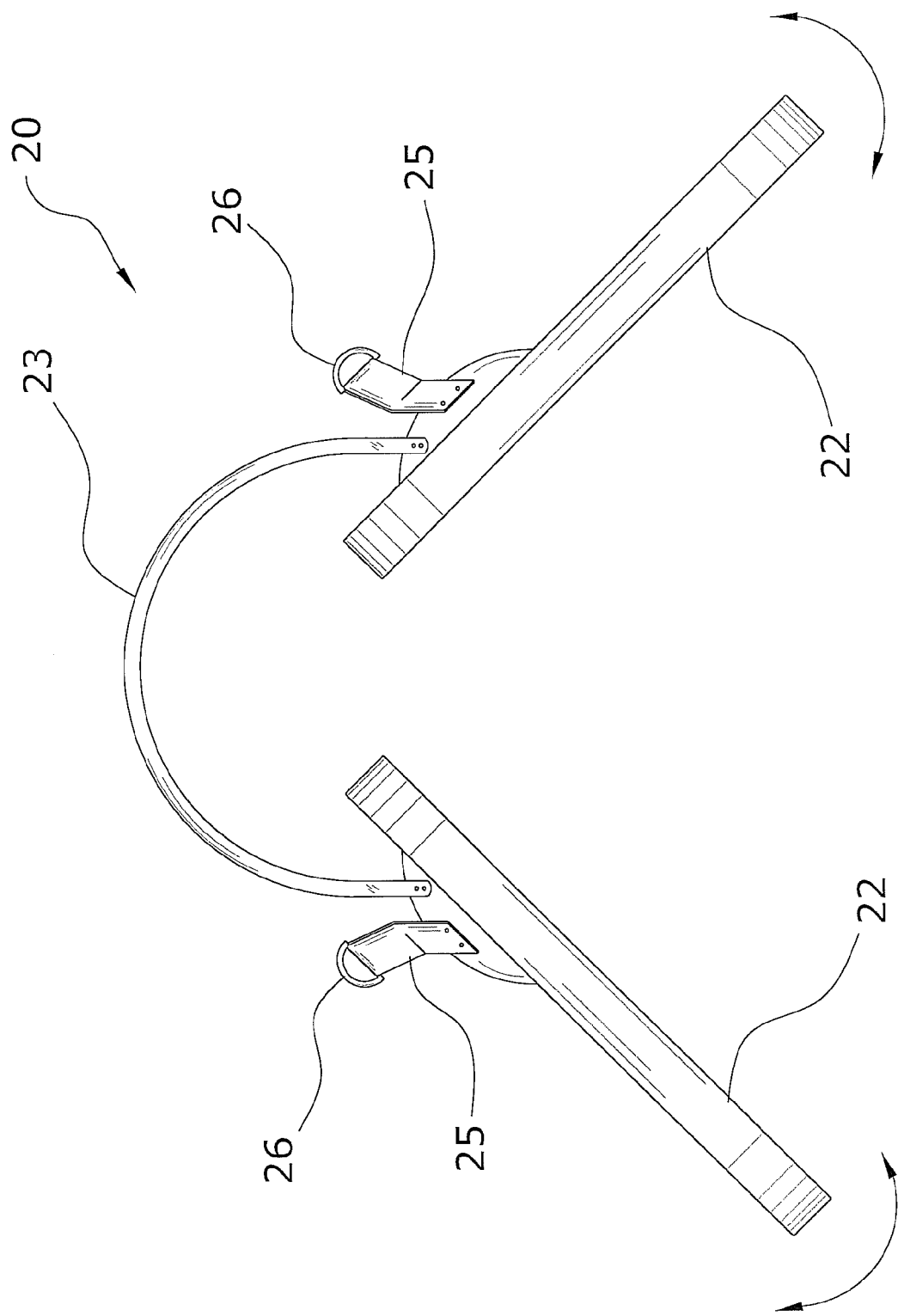
FIG. 8 is a front view of the saddle tree illustrating the support members pivoting.

The support members 22 are also preferably pivotally attached to the connecting rings 23 as illustrated in FIG. 8. The support members 22 are able to pivotally attach to accommodate for various shape and size backs of various horses, wherein the support members 22 preferably lie flat along the back of the horse 12.

A pair of straps 25 each including a guide ring 26 also extend from the support members 22. The guide rings 26 are preferably comprised of a D-shaped ring configuration. The straps and guide rings 26 preferably extend from the front end of the support members 22. The guide rings 26 receive the driving lines 15 of the bridle 14, wherein the driving lines 15 are strung through the guide rings 26 to allow a trainer of the horse 12 to "ground drive" the horse 12 while utilizing the present invention.

C. Harness device

The harness device 30 is positioned over the saddle tree 20 and extended around the belly and back of the horse 12 to secure the present invention to the horse 12. The harness device 30 is comprised of a flexible configuration to efficiently wrap around the horse 12 and account for various shapes of horses. In the present invention, the harness device 30 is primarily comprised of nylon straps; however it is appreciated that the harness device 30 may be comprised of various configurations rather than the preferred embodiment.

The harness device 30 and the saddle tree 20 are also meant to extend over the entire front portion of the back of the horse 12 to increase a maximum amount of back muscles of the horse 12. It is appreciated that the size of the present invention and thus number of pouches and weighted objects 50 are manufactured to fit all sizes according to the size of the horse 12 (e.g. a pony would generally need less weighted objects 50 and thus a smaller harness device 30 because a child or small individual generally rides a pony).

The harness device 30 includes a webbing portion 31 centrally positioned upon the harness device 30. The webbing portion 31 is attached to the support members 22 of the saddle tree 20 via a plurality of fasteners 39 (e.g. screws, bolts, etc.). It is appreciated that the fasteners 39 do not extend completely through the support members 22 to keep the fasteners 39 from engaging the horse 12. The webbing portion 31 also preferably retains a plurality of upper pouches 40 about the back of the horse 12.

A plurality of straps 32, 33, 34, 35 also extend from the webbing portion 31 of the harness device 30 to secure the harness device 30 and saddle tree 20 to the horse 12. The straps 32, 33, 34, 35 are also substantially narrow (e.g. 2 inches) to allow for a plurality of rows of straps 32, 33, 34, 35 extending from the webbing portion 31. The straps 32, 33, 34, 35 preferably include a plurality of front straps 32, center straps 33, rear straps 34, and a breast strap 35. The front straps 32 and the rear straps 34 preferably extend from the respective front end and rear end of the webbing portion 31. The front straps 32 and the rear straps 34 are further preferably parallel to each other and extend around the belly of the horse 12 and secure upon themselves.

The front strap 32 and the rear strap 34 are preferably comprised of saddle girths common in the art of saddles, wherein the front strap 32 and the rear strap 34 may include padding or be comprised of various types of strap configurations to efficiently and securely attach the present invention to the horse 12. The rear strap 34 may also include various connectors 37 (e.g. buckles, clasps, cam buckles, ratcheting mechanisms, etc.) to secure the strap upon itself. The front strap 32 is preferably attached around the belly of the horse utilizing a saddle cinch common in the art; however it is appreciated that various types of connectors 37 may be utilized in place of the saddle cinch.

The center strap 33 also extends from the webbing portion 31 of the harness device 30 preferably between the front strap 32 and the rear strap 34. The center strap 33 further extends around the horse 12 in an area similar to where a rider usually positions their legs, wherein the center strap 33 preferably simulates a rider's legs to more accustom the horse 12 to the rider. The center strap 33 also includes connector 37 (e.g. buckle, cams, clasp, ratcheting mechanism, etc.) to secure the center strap 33 around the horse 12.

The breast strap 35 preferably extends from the front of the webbing portion 31 perpendicular to the front strap 32. The breast strap 35 extends around the breast or neck of the horse 12 to prevent the present invention from sliding back upon the horse 12 during use and to maintain the present invention in a location similar to where a rider would sit upon the horse 12. The breast strap 35 also includes connector 37 (e.g. buckle, clasp, ratcheting mechanism, etc.) to secure the breast strap 35 around the horse 12. It is appreciated that each of the straps may be attached to the webbing portion 31 in various manners, such as but not limited to sewn upon the webbing portion 31.

A connecting strap 36 preferably extends from the rear strap 34 to the front strap 32. The connecting strap 36 is also preferably adjustable in length. The connecting strap 36 further preferably extends from the rear strap 34 so that when the present invention is secured to the horse 12 the connecting strap 36 extends along a bottom longitudinal center of the horse 12 towards the front strap 32. The connecting strap 36 serves to prevent the front strap 32 and rear strap 34 from shifting and thus prevent the harness device 30 from moving about the horse 12. The connecting strap 36 also includes connector 37 (e.g. buckle, clasp, ratcheting mechanism, etc.) to secure the connecting strap 36 to the front strap 32.

D. Pouches

A plurality of pouches 40, 42, 43 are attached to the harness device 30, wherein the plurality of pouches 40, 42, 43 removably receive and hold weighted objects 50 upon the harness device 30. Each of the pouches 40, 42, 43 preferably includes a closure device 45 (e.g. buckle, clasp, tie string, etc.) to close a flap upon the respective pouches 40, 42, 43 and prevent the weighted object 50 from falling out of the respective pouches 40, 42, 43. Each of the pouches 40, 42, 43 also inherently includes at least one cavity for receiving the weighted object 50, wherein the cavity is preferably a substantially similar size as the weighted object 50. The pouches 40, 42, 43 are also preferably comprised of mildew resistant waterproof material and are further preferably comprised of a polyvinyl chloride coated mesh material.

The present invention includes a plurality of upper pouches 40 attached to the webbing portion 31. There preferably is an equal number of upper pouches 40 attached on both sides of the webbing portion 31 so that an equal number of weighted objects 50 may be held by the harness device 30 on both sides of the horse 12.

The upper pouches 40 are also preferably attached (i.e. via sewn, etc.) to the webbing portion 31 on an upper end of each of the upper pouches 40 only so that the upper pouches 40 are able to bounce or move (i.e. via pivoting) around while in use. Having the upper pouches 40 move helps to better simulate an actual rider upon the horse 12 to better accustom the horse 12 to the actual rider. In the preferred embodiment, each side of the webbing portion 31 preferably includes 2 rows of 5 upper pouches 40 for a total of 20 upper pouches 40; however it is appreciated that the webbing portion 31 may include various numbers of upper pouches 40.

The present invention also includes a plurality of lower pouches 42, 43 attached to the center straps 33 to simulate the weight of a leg of a rider hitting against the side of the horse 12 during riding of the horse 12. There preferably is an equal number of lower pouches 42, 43 attached on both sides of the center strap 33 so that an equal number of weighted objects 50 may be held by the harness device 30 on both sides of the horse 12.

The lower pouches 42, 43 are also preferably attached (i.e. via sewn, etc.) to the center strap 33 on an upper end of each of the lower pouches 42, 43 only so that the lower pouches 42, 43 are able to bounce or move (i.e. via pivoting) around while in use. Having the lower pouches 42, 43 move helps to better simulate moving legs of an actual rider upon the horse 12 to better accustom the horse 12 to the actual rider. In the preferred embodiment, each side of the center strap 33 preferably includes 4 first lower pouches 42, wherein 2 first lower pouches 42 are positioned upon each side of the center strap 33. A longitudinal axis of the first lower pouch 42 is further preferably parallel to the longitudinal axis of the center strap 33.

Also in the preferred embodiment, each side of the center strap 33 preferably includes 1 second lower pouch 43. A longitudinal axis of the second lower pouch 43 is further preferably perpendicular to the longitudinal axis of the center strap 33. The present invention thus preferably includes 5 lower pouches 42, 43 on each side of the horse 12 for a total of 10 lower pouches 42, 43; however it is appreciated that the center strap 33 may include various numbers of lower pouches 42, 43. The second lower pouches 43 also serve to simulate the foot of a rider of the horse 12.

E. Weighted Objects

The weighted objects 50 are preferably comprised of a non rigid configuration to better conform to the shape of the horse 12 when positioned within a respective pouch. In the preferred embodiment, the weighted objects 50 are comprised of a weight of approximately 5 pounds; however it is appreciated that the weighted objects 50 may be comprised of various pounds. The weighted objects 50 are also preferably comprised of a casing 52 filled with a plurality of shot 53. The casing 52 is preferably comprised of a bag or sack configuration. The shot 53 is preferably comprised of a plurality of steel shot 53 pellets.

F. Operation of Preferred Embodiment

In use, the trainer first positions the saddle tree 20 and harness device 30 as one unit upon the back of the horse 12 in a location in which a rider would usually position themselves when riding the horse 12. The support members 22 are also adjusted (i.e. via pivoting) to ensure the support members 22 lie flat against the upper sides of back portion of the horse 12.

Each loose end 32', 32" of the front strap 32 is then strung around the underside (i.e. belly) of the horse 12 and attached upon each other with the saddle cinch. The same is done for each loose end 34', 34" of the rear strap 34 and each loose end 33', 33" of the center strap 33 except for utilizing the connectors 37 instead of the saddle cinch. The connecting strap 36 is then secured to the front strap 32 thus securing the rear strap 34 to the front strap 32. Each loose end 35', 35" of the breast strap 35 is then secured around the breast or neck of the horse 12.

The trainer may now insert a desired amount of weighted objects 50 within the pouches, preferably starting with the upper pouches 40 and maintaining an equal number of weighted objects 50 upon each side of the horse 12. It is appreciated that only one weighted object 50 is positioned within a respective pouch. If early in the training process, a minimal amount of weighted objects 50 are utilized. It is appreciated that as the training process progresses, the number of weighted objects 50 utilized and thus pouches is increased until the total pounds of the weighted objects 50 is substantially similar to the weight of the individual that is to ride the horse 12. The tautness of the straps 32, 33, 34, 35 may also be needed to be increased after increasing or decreasing the amount of weighted objects 50 utilized.

In the preferred embodiment, the present invention is able to hold 30 weighted objects 50 for a total of 150 pounds; however it is appreciated that the present invention may be customized to hold various other weights. It is also appreciated that if the trainer desires to "ground drive" the horse 12, a bridle 14 may be secured to the horse 12 and driving lines 15 may be extended through the guide rings 26. The driving lines 15 may also be adjustably secured to the guide rings 26.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. An equine weight training system, comprising:
    a saddle tree to be positioned upon a back of a horse;
    a harness device including a plurality of straps, wherein said plurality of straps extend outwardly from said harness device and wherein said harness device extends over said saddle tree to allow said plurality of straps to loop around a horse;
    a plurality of pouches extending from said harness device; and
    a plurality of weighted objects removably positioned within said plurality of pouches, wherein said plurality of weighted objects are inserted and removed from said plurality of pouches to accustom a horse to weight positioned upon a back of a horse;
    wherein said plurality of straps include at least one center strap to simulate legs of a rider upon a horse;
    wherein said plurality of pouches includes a plurality of upper pouches and a plurality of lower pouches, wherein said plurality of lower pouches extend from said at least one center strap;
    wherein said plurality of lower pouches include a plurality of first lower pouches and a plurality of second lower pouches;
    wherein said plurality of first lower pouches are perpendicular to said plurality of second lower pouches.

2. The equine weight training system of claim 1, wherein said saddle tree pivotally adjusts.

3. The equine weight training system of claim 1, wherein said saddle tree include at least one guide ring extending from said saddle tree.

4. The equine weight training system of claim 3, wherein said at least one guide ring receives at least one driving line.

5. The equine weight training system of claim 1, wherein said plurality of pouches move with respect to said harness device to allow said plurality of weighted objects to move with respect to said harness device.

6. The equine weight training system of claim 5, wherein said plurality of pouches and said plurality of weighted objects pivot with respect to said harness device.

7. The equine weight training system of claim 1, wherein said harness device includes a webbing portion to extend along a majority of a back of a horse.

8. The equine weight training system of claim 1, wherein said harness device is fixedly attached to said saddle tree via a plurality of fasteners.

9. The equine weight training system of claim 1, wherein said plurality of second lower pouches simulate a foot of a rider of a horse.

10. An equine weight training system, comprising:
    a saddle tree to be positioned upon a back of a horse;
    wherein said saddle tree includes at least one guide ring;
    wherein said saddle tree pivotally adjusts;
    a harness device including a webbing portion and a plurality of straps, wherein said plurality of straps extend outwardly from said webbing portion and wherein said harness device extends over said saddle tree to allow said plurality of straps to loop around a horse;
    wherein said plurality of straps include at least one front strap, at least one rear strap, at least one center strap and a breast strap;
    a plurality of pouches movably attached to said harness device;
    wherein said plurality of pouches are movably attached with respect to said harness device;
    wherein said plurality of pouches include a plurality of upper pouches extending from said webbing portion and a plurality of lower pouches extending from said center strap;
    wherein said plurality of lower pouches simulate a leg and a foot of a rider of a horse; and
    a plurality of weighted objects removably positioned within said plurality of pouches, wherein said plurality of weighted objects are inserted and removed from said plurality of pouches to accustom a horse to weight positioned upon a back of a horse.

* * * * *